(12) United States Patent
Heinrich (10) Patent No.: US 9,614,426 B2
(45) Date of Patent: Apr. 4, 2017

(54) DISPLAY MODULE FOR AN INSTRUMENT PANEL WITH FLUID MOVEMENT (71) Applicant: MOVING MAGNET TECHNOLOGIES (MMT), Besançon (FR)

(72) Inventor: Sébastien Heinrich, Herimoncourt (FR)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 137 days.

(21) Appl. No.: 14/357,960

(22) PCT Filed: Nov. 13, 2012

(86) PCT No.: PCT/FR2012/052611
§ 371 (c)(1),
(2) Date: May 13, 2014

(87) PCT Pub. No.: WO2013/072615
PCT Pub. Date: May 23, 2013

(65) Prior Publication Data
US 2014/0283732 A1  Sep. 25, 2014

(30) Foreign Application Priority Data

Nov. 14, 2011 (FR) ...................... 11 60300

(51) Int. Cl.
*H02K 37/16* (2006.01)
*H02K 7/116* (2006.01)
(Continued)

(52) U.S. Cl.
CPC ............ *H02K 37/14* (2013.01); *G01D 13/22* (2013.01); *H02K 7/116* (2013.01); *H02K 37/16* (2013.01)

(58) Field of Classification Search
CPC . G01D 5/02; G01D 5/08; H02K 7/116; H02K 37/116; F16H 57/00
(Continued)

(56) References Cited

U.S. PATENT DOCUMENTS 4,260,926 A * 4/1981 Jarret ................... H02K 19/103
310/163
5,720,590 A 2/1998 Hofmeister
(Continued)

FOREIGN PATENT DOCUMENTS

DE         19633345 A1     2/1998
DE       102010026263   *  1/2012 ............. H02K 1/148
(Continued)

OTHER PUBLICATIONS

English Translation of the International Preliminary Report on Patentability (Chapter I) IB, Geneva, issued May 20, 2014 (6 pages), incorporating the English Translation of the Written Opinion of the ISA, ISA/EP, Rijswijk, NL, mailed Feb. 1, 2013 (5 pages).

Primary Examiner — R. A. Smith
(74) Attorney, Agent, or Firm — Harness, Dickey & Pierce, P.L.C.

(57) ABSTRACT

A display module has a two-phase motor which includes a rotor including N pairs of poles magnetized radially, in alternate directions, N being equal to 3 or 5, and a stator part including at least two W-shaped circuits made from radial pole teeth extending inwards from a peripheral closed belt and including a coil on a central leg of the W, the W-shaped circuits being arranged in such a way that when the central tooth of one of the W-shaped circuits is positioned facing a rotor magnetic transition, at least one central tooth of another W-shaped circuit is positioned facing a rotor magnetic pole. The display module additionally includes at least one specific mechanical interaction between the rotor and
(Continued)

the stator, such as angular friction at a force that is substantially constant depending on the speed of the rotor relative to the stator.

22 Claims, 4 Drawing Sheets

(51) Int. Cl.
*G01D 13/22* (2006.01)
*H02K 37/14* (2006.01)

(58) Field of Classification Search
USPC ..... 116/284; 310/49.01, 49.47, 49.48, 49.49, 310/49.53, 216.021, 216.022
See application file for complete search history.

(56) References Cited

U.S. PATENT DOCUMENTS

| | | | |
|---|---|---|---|
| 6,043,574 A | 3/2000 | Prudham | |
| 6,102,164 A | 8/2000 | McClintock et al. | |
| 6,520,108 B1 | 2/2003 | Komura | |
| 6,670,731 B2 | 12/2003 | Kotani et al. | |
| 6,989,615 B2 | 1/2006 | Abe et al. | |
| 6,994,053 B2 | 2/2006 | Abe et al. | |
| 7,503,278 B2 | 3/2009 | Sigg et al. | |
| 2002/0047765 A1* | 4/2002 | Totsuka | G01R 7/06 335/270 |
| 2004/0178685 A1* | 9/2004 | Abe | H02K 37/14 310/49.01 |
| 2007/0290580 A1* | 12/2007 | Hsiao | G01R 7/06 310/12.27 |
| 2010/0181948 A1* | 7/2010 | Taniguchi | H02K 29/03 318/400.3 |
| 2012/0318081 A1* | 12/2012 | Fukuda | G01D 11/10 74/89 |
| 2013/0118398 A1 | 5/2013 | Prudham | |

FOREIGN PATENT DOCUMENTS

| | | | | |
|---|---|---|---|---|
| EP | 1244200 A2 * | 9/2002 | | H02K 1/141 |
| EP | 1450138 A2 * | 8/2004 | | G01D 11/24 |
| EP | 1458082 A1 * | 9/2004 | | H02K 7/116 |
| EP | 1806822 A1 * | 7/2007 | | H02K 1/08 |
| FR | 2679998 A1 | 2/1993 | | |
| JP | 2002022502 A * | 1/2002 | | G01D 13/22 |
| JP | 2004-251354 A | 9/2004 | | |
| JP | 2005253246 A * | 9/2005 | | H02K 15/14 |
| WO | WO-2006120515 A1 | 11/2006 | | |

* cited by examiner

DISPLAY MODULE FOR AN INSTRUMENT PANEL WITH FLUID MOVEMENT

CROSS-REFERENCE TO RELATED APPLICATIONS

This application is a National Phase Entry of International Application No. PCT/FR2012/052611, filed on Nov. 13, 2012, which claims priority to French Patent Application Serial No. 1160300, filed on Nov. 14, 2011, both of which are incorporated by reference herein.

FIELD OF THE INVENTION

The present invention concerns the field of stepping electric motors for the precise positioning of a member, at an angular position of generally less than 360°. It concerns more particularly an instrument-panel display module.

BACKGROUND

In the prior art, the American patent U.S. Pat. No. 6,043,574 is known, describing a two-phase motor formed by a stator part excited by electric coils and a magnetised rotor having N pairs of poles magnetised radially in alternate directions, N being equal to 3 or 5. The stator part has at least two W-shaped circuits each comprising an electric coil surrounding the central leg. The W-shaped circuits are disposed so that, when one of the central legs is situated facing a magnetic transition, the other central leg is situated facing a magnetic pole. The pole shoes of the legs of a W-shaped circuit being spaced apart angularly by $\pi/4$ and the pole shoes of the central legs of two W-shaped circuits belonging to different phases being separated angularly by an angle of approximately $\pi/2 \pm k \cdot \pi/N$, where N is the number of pairs of magnetic poles, that is to say 3 or 5, and k is equal to 0, 1 or 2.

The French patent FR 2807160 of the company DENSO is also known, describing a display measurement apparatus comprising a dial, a housing disposed behind the dial, a drive control section disposed in the housing, and a rotary shaft driven by the drive control section.

The rotary shaft is composed of two thin shafts supported respectively by two bearings and a thick shaft connecting the two thin shafts. The length and outside diameter of each thin shaft are such that the ratio of the length to the outside diameter guarantees sufficient bending strength. Consequently the rotary shaft turns without any jolts and a display needle carried by the shaft indicates precise values of an operating condition of the vehicle.

The technical objective of the solutions of the prior art is to increase the torque and to eliminate the flux closure piece without losing the advantage of the simplicity of manufacture and the possibilities of integrating associated mechanisms such as reducers.

The Japanese patent application JP 2004 251354 is also known, describing an actuator improved so as to remedy the problem of the flow of lubrication oil towards an output rotation shaft.

This patent describes an actuator for a measuring apparatus comprising a housing, a rotor rotated by interaction with a stator and a speed reduction gear train for decelerating the rotation of the rotor.

The speed reducer comprises a train of output reducing gears in which an output rotation shaft is placed at the centre of the part projecting out of housing and the teeth are disposed on the external periphery. In the output gear, the grooves are formed so as to prevent the lubricating oil from flowing from the part of the teeth of the output rotation shaft. The grooves are provided in the radius direction of the output gears around the output rotation shaft.

The device has arms that are intended to recover the oil, which is transmitted towards the seat in order to prevent the oil spreading over the display window.

These rubbing arms have an oil discharge function.

The actuator described European patent EP 1244200 is also known, comprising a stepping motor provided with a rotor having a plurality of magnetic poles along the circumferential direction thereof, a pair of magnetic yokes arranged to face the magnetic poles of the rotor, and a pair of excitation coils to excite the pair of magnetic yokes respectively in response to pulses that produced the phase differences.

The European patents EP 1458082 and EP 1450138 describing variants of actuators are also known.

These solutions of the prior art are roughly satisfactory, but it appears that the movement of the driven member exhibits, in some cases, jolts, resulting firstly from the functioning and characteristics of the motor (torque without excessively high current and torque with non-constant current) and secondly from the clearances in the gear train. These jolts are in particular present when certain speeds are reached by the display. From the point of view of the user, the first drawback is the lack of fluidity of the movement perceived by the user, which represents visual discomfort as well as loss of precision of information. The second drawback, due to the excessive vibrations produced by these jolts, is a noise audible to the user, also representing discomfort. Finally, these same vibrations may have a detrimental effect on the service life of the motorised assembly, requiring early replacement thereof.

SUMMARY

In order to improve the fluidity of the driven member, the present invention concerns, in its most general acceptance, a display module having a two-phase motor comprising a rotor having N pairs of poles magnetised radially, in alternate directions, N being equal to 3 or 5, and a stator part having at least two W-shaped circuits made from radial polar teeth extending inwards from a closed peripheral belt and having a coil on the central leg of the W, said W-shaped circuits being disposed so that, when the central tooth of one of the W-shaped circuits is situated facing a rotor magnetic transition, at least one central tooth of another W-shaped circuit is situated facing a rotor magnetic pole. In addition, it comprises at least one specific means of mechanical interaction between the rotor and the stator providing angular friction at a force that is substantially constant according to the relative speed of the rotor with respect to the stator, and with a value less than the torque produced by the electromagnetic interaction between the rotor and the stator. This angular friction is a dry friction, which exerts a force that opposes the relative movement of the two bodies in contact, in the absence of lubricant. Dry friction between two non-lubricated surfaces is a complex phenomenon characterised by the fact that:
  the friction force is proportional to the force that presses the two surfaces against each other,
  the friction force is independent of the apparent contact area,
  the kinetic friction force is independent of the relative velocity of the two surfaces.

The sensor according to the invention contains no lubricant, and in particular the space containing the gears is devoid of lubricant and in particular liquid lubricant.

The friction has a perpendicular component parallel to the rotation axis providing the abutment of the two surfaces in contact, and a tangential component producing the force of resistance to the angular movement by the interaction of the two surfaces in contact.

The interposing of a friction means is very unusual for a person skilled in the art, who generally seeks to reduce the friction in his system.

The friction torque to be produced must be produced with regard to the residual torque of the motor, that is to say the torque of interaction without current between the magnetised rotor and the ferromagnetic poles of the stator. Preferably, the friction introduced must produce a torque advantageously between the residual torque (without current) and the motor torque (with current).

Preferentially, with torque will at a minimum be twice as great as the maximum of the residual torque of the motor. In doing this, this friction torque will guarantee a fluid movement of the display actuated by the motor and will reduce the operating noise.

This dry friction creates a current-free torque disturbance $C_0$. Advantageously this minimum friction torque is approximately twice as great as the current-free residual torque $C_0$.

According to a preferred embodiment, the module comprises more precisely a housing secured to the stator, an assembly for the mechanical reduction of rotor speed comprising an output wheel driving a pointer and a dedicated mechanical interaction means formed by at least one arched friction arm produced cut in the discal part of said output wheel and a sliding track secured to said housing.

Preferentially, said friction arm is produced from polyoxymethylene (POM) polymer. Because of the change in the mechanical creep of the material, it will be necessary, ideally, to size the friction arm in accordance with the well known materials strength formulae and the known coefficients of friction of POM, in order to obtain a friction torque, when new (that is to say on production), much greater than the final friction torque sought (around 3 to 5 times the final value). Thus, for a motor with a residual torque of 20 μNm for which the friction on the output wheel to be achieved is therefore 40 μNm, the friction arm or arms will be sized so as to obtain a torque, when new, of at least 120 to 200 μNm. Over time, or with accelerated aging under a high thermal gradient, the creep of the material (reduction of the mechanical modulus) will cause a reduction in the friction, which will stabilise towards the required final value. This is because it has been observed experimentally that Delrin could lose approximately 80% of its mechanical elasticity modulus (Young's modulus) under stress.

Preferentially also, said sliding track comes into contact with the end of said friction elements and has a curved shape with a radius of typically around 0.4 mm.

Preferably, the module comprises N flexible friction arms, the sliding ends of which are spaced apart by 360/N degrees, N being equal to 2 or 3.

According to a particular variant, the stator has an annular belt, a set of teeth extending radially from an annular segment forming a shoulder for fixing on the housing having a mechanical connection means of complementary shape.

This shoulder provides a mechanical connection of great stiffness between the stator and the housing and reduces a source of clearance between the stator and the rotor by means of the housing.

According to another advantageous variant, the stator has at least five teeth with lengths, measured radially, that are identical. This embodiment reduces another source of jolts.

Preferably, for the W-shaped circuits, the length of the wound teeth is identical.

Advantageously, the length of the coil and the teeth carrying said coil are substantially equal but less than the cross section of the hollowed-out central area of the stator.

According to a preferred embodiment, the ends of the teeth are parallelepipedal in shape. This solution increases the torque with current and thus contributes to an improvement in the fluidity of movement.

BRIEF DESCRIPTION OF THE FIGURES

The features and advantages of the invention will emerge from the following reading of detailed example embodiments, with reference to the accompanying figures, which show respectively.

DETAILED DESCRIPTION

Figure 1:
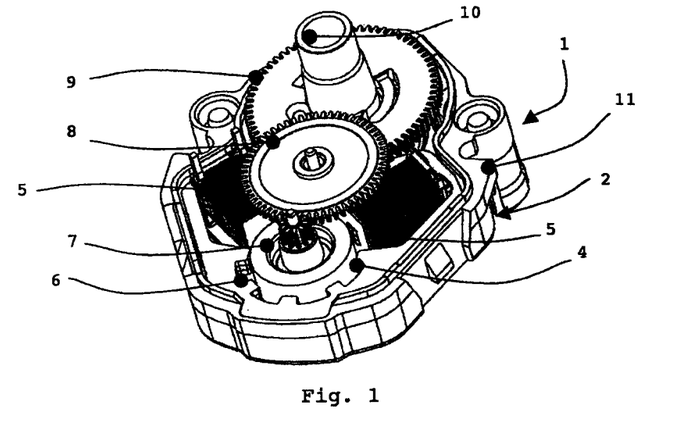
FIG. 1, a three-quarter view of a first module according to an embodiment of the invention with the top cover of the housing removed.
Figure 2:
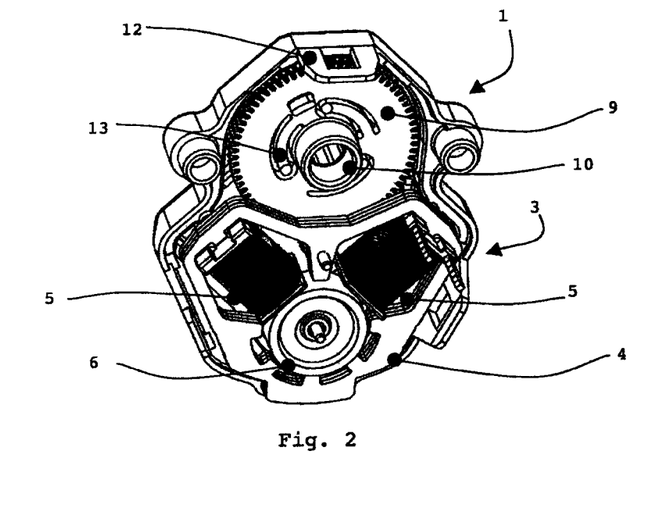
FIG. 2, a three-quarter view of a first module according to the embodiment of the invention with the bottom cover of the housing removed.

FIG. 1 presents a display module 1 in a three-quarter view without the top cover, referenced 3 in FIG. 2. This top cover 3 forms, with the bottom cover 2, a housing containing all the elements enabling the rotation of a member to be controlled, in this case an indicator needle or pointer, not shown here. The bottom cover 2 has two deformable mechanical connection lugs 11 enabling the housing to be positioned on a printed circuit, not shown here.

Figure 8:
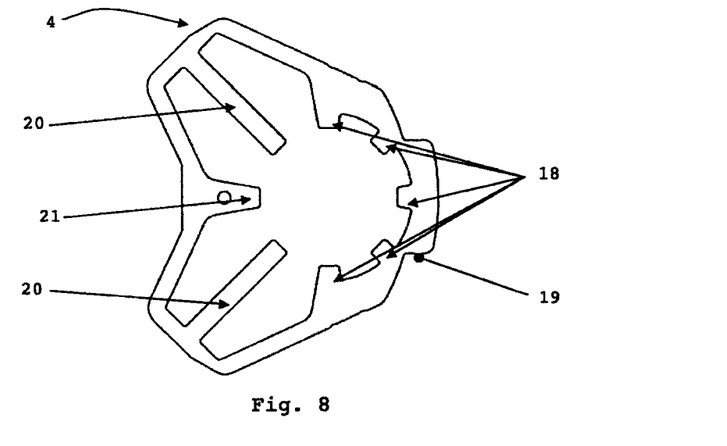
FIG. 8, an isolated view of the soft ferromagnetic stator of the motor integrated in the first display module.

Inside the display module 1 there is a motor composed of a soft ferromagnetic stator 4 formed by several teeth, referenced 18, 20, 21 in FIG. 8, two teeth 20 of which carry coils 5 intended to be supplied with electric current. The magnetic flux produced by these coils 5 interacts with a magnetised rotor 6 having N poles, N being equal to 3 or 5, in order to move the magnetised rotor 6 relative to the soft ferromagnetic stator 4.

In order to reduce the rotation speed of the member to be moved, a reduction assembly comprises a first wheel 7 secured to the magnetised rotor 6, an intermediate wheel 8 meshing on the first wheel 7 and an output wheel 9. The reduction system thus formed comprises three separate wheels.

The third and last wheel, the output wheel 9, extends axially in order to form a hollow spindle (10) receiving the member to be controlled, in this case the indicator needle, not shown here.

FIG. 2 presents the display module 1 in a three-quarter view without the bottom cover 2. This bottom cover 2 is mechanically connected to the top cover 3 by the connection element 12. The output wheel 9 has three friction arms 13 cut in said output wheel 9, able to be deformed in flexion in the axial direction, that is to say along the rotation axis of the hollow spindle 10.

These arms are delimited by a cutout in the shape of a curved hairpin, the rear end, opposite to the sliding end (15), being an extension of the hub of the wheel (9). These friction arms 13 are intended to be constrained mechanically when the bottom 2 and top 3 covers are mounted together to form the housing, by abutment of the curved sliding end, referenced in FIG. 4, of the friction arms 13 on a sliding track, referenced 14 in FIG. 3, secured to the bottom cover 2. The curved shape of the end 15 provides a secure contact at one point. This curved shape 15 produces a slight protrusion with respect to the surface of the wheel 9, which puts the arm under stress. This stress provides a slight deformation of the arm (with a movement of the curved part of around 0.15 to 0.25 mm), with respect to the rear end, and produces an application with a force parallel to the rotation axis of the wheel providing constant contact of the curved area against the sliding track 14.

Figure 3:
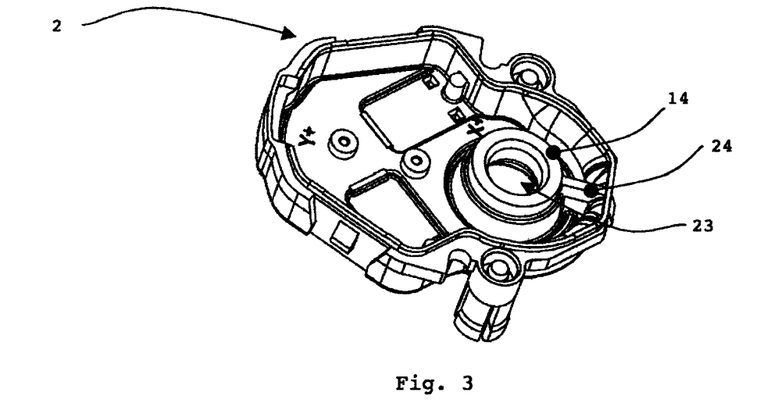
FIG. 3, an isolated view of the bottom cover of the motor housing.

In FIG. 3, showing this bottom cover 2, the circular sliding track 14 can be seen on the periphery of an opening 23 intended to allow the hollow spindle 10 to pass, emerging on the two bottom 2 and top 3 covers.

Figure 4:
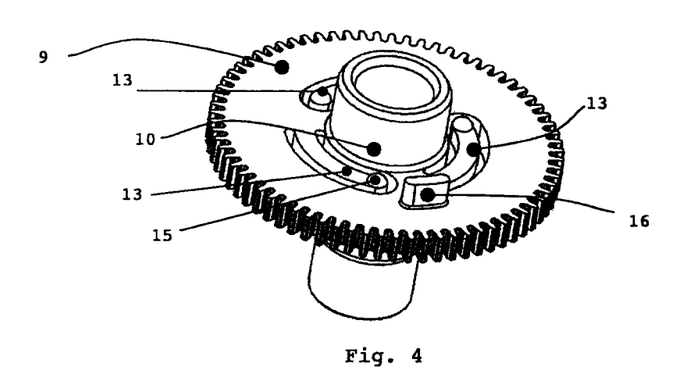
FIG. 4, an isolated three-quarter view of the output wheel of the mechanical reduction device integrated in the first display module.
Figure 5:
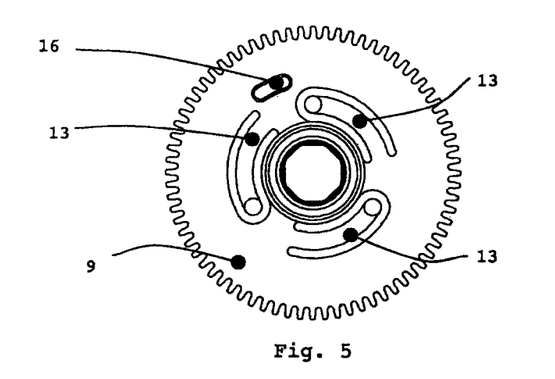
FIG. 5, an isolated front view of the output wheel of the mechanical reduction device integrated in the first display module.

On the isolated views of the output wheel 9 shown in FIGS. 4 and 5, the three friction arms 13 distributed at 120° around the hollow spindle 10 can be seen better. These three friction arms 13 are cut in the wheel to a certain length and width, which must be adjusted so as to provide optimum axial stiffness. The exact sizing of these arms 13 is achieved by calculating the strength of the materials. The polymer plastics material of the polyoxymethylene (POM) type is favoured since it makes it possible to obtain a stiffness compatible with the application and the size of the output wheel 9 while preserving an advantageous mechanical resistance in strength. The sizing of these friction arms 13 is done by a calculation of strength of the materials, considering the arm 13 as a beam. The friction force for obtaining the required friction torque to be applied to the output wheel 9 makes it possible to size the arm by optimisation of the width and length of the arm, knowing the maximum allowable deformation of the arms 13 in accordance with the following formula:

$$F = \frac{3 \cdot E \cdot I_{GZ} \cdot y}{l^3}$$

where E [N/m²] is the Young's modulus of the material used, $I_{GZ}$ [m⁴] is the quadratic moment of the beam formed with respect to the bending axis, y [m] is the deflection of the curved sliding end 15, and l [m] the length of the friction arm 13.

Each of these friction arms 13 therefore has a curved sliding end 1) that comes into isolated sliding abutment on the sliding track 14 of the bottom cover 2.

By way of a particularly representative but in no way limitative example, for an output wheel having a diameter of around 10 mm, an effective solution is to produce three friction arms 1 mm wide on a diameter of 7.85 mm and each with an angular opening close to 75°.

On this output wheel 9 there is also produced, moulded, a mechanical stop 16 that cooperates with the stop 24 of the bottom cover 2, as shown in FIG. 3, in order to constitute a mechanical constraint preventing the output wheel from making an excessively large angular travel.

Figure 6:
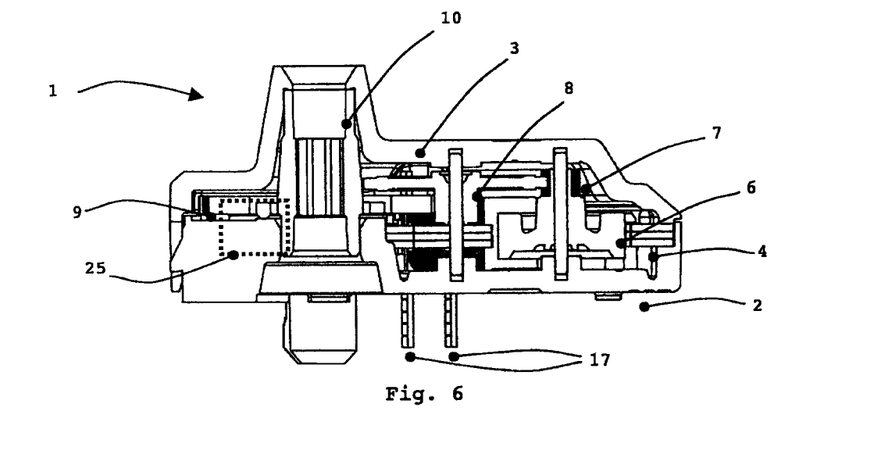
FIG. 6, a view in cross section of the first display module.

FIG. 6, representing a view in cross section of the display module 1, shows the electrical connection lugs 17 of the coils fixed to connection pads connected to the printed circuit (not shown). More particularly, in this FIG. 6, the output wheel 9 is pointed to. The box 25 in broken lines does not have a structural meaning but represents the area that is shown, in more detail, in FIG. 7.

Figure 7:
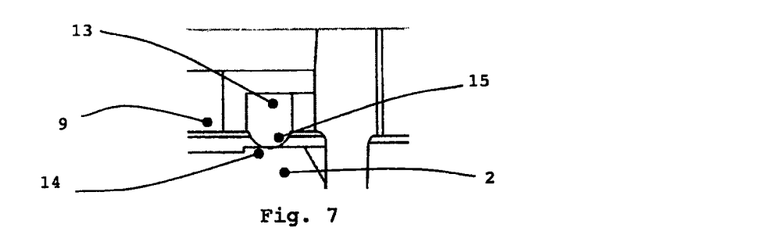
FIG. 7, a detail view of the cross-section view shown in FIG. 6.

In this FIG. 7, the output wheel 9 with one of the friction arms 13 thereof is shown. Through the mechanical contact with the sliding track 14 of the bottom cover 2, the friction arm 13 is axially constrained in flexion, thus providing, during the relative movement of the output wheel 9 with respect to the cover 2, the introduction of a coulomb friction limiting the movement of the output wheel 9 caused either by torques with and without current varying over time, or by excessive mechanical plays. This movement, which may be greater or lesser depending on the angular velocity of the output wheel 9, is thus greatly limited by the presence of the friction arms 13 constrained and in contact with the bottom cover 2 via the sliding track 14 of said bottom cover 2. According to the type of display (size, material), the desired rotation speed and the level of quality of display required, the friction torque and therefore the number and sizes of the friction arms 13 will be different but always guided by the sizing explained above. An experimental approach is also a great aid in sizing in order to take account of any non-linearities of the mechanical system as well as the change in the mechanical creep of the material, which changes over time and requires temporal and/or thermal stabilisation.

FIG. 8 presents an isolated view of the soft ferromagnetic stator 4 in its preferred embodiment, comprising two long teeth 20 carrying the electric coils 5, a central tooth 21 between the two long teeth 20, and five identical teeth 18. These teeth thus form two W-shaped circuits, one tooth of which is common to each. The distribution of the teeth affords minimisation of the current-free torque and thus helps to minimise jolts on the indicator needle 22. The teeth have ends with a parallelepipedal shape for channeling the magnetic flux in the optimum manner, helping to increase the torque with current.

On the external shape of the stator 4, a shoulder 19 is produced for better location of the stator 4 in the bottom cover 2.

Figure 9:
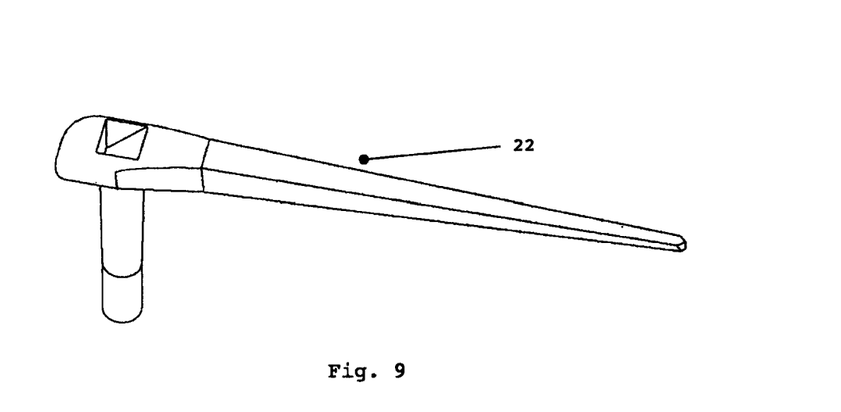
FIG. 9, an isolated view of a pointer driven by the first display module.

FIG. 9 shows an indicator needle or pointer 22 driven by the hollow spindle 10.

Figure 10:
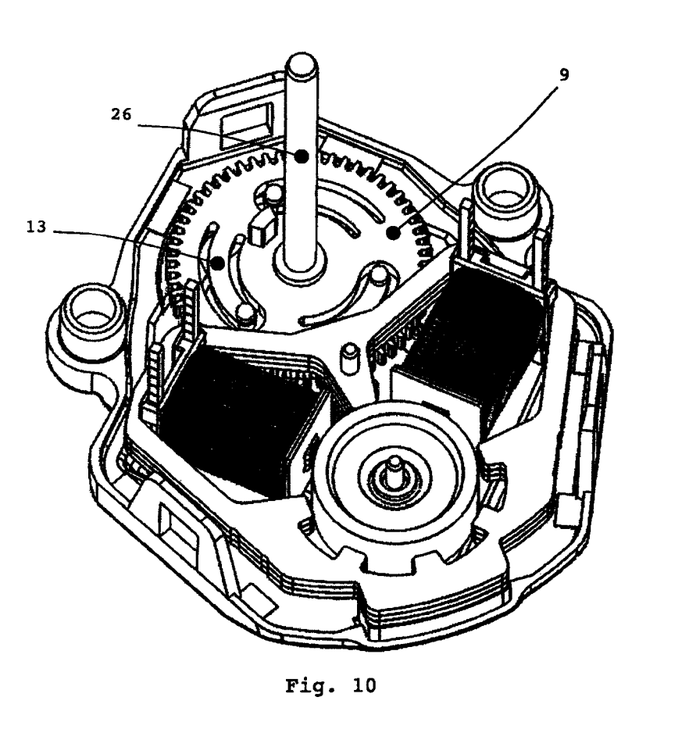
FIG. 10, a three-quarter view of a second display module according to a second embodiment of the invention with the bottom cover of the housing removed.

FIG. 10 shows a second display module (1) according to a second embodiment of the invention. This second module is distinguished from the first in that the output wheel 9 is not extended by a hollow spindle but is secured to a needle 26 that is the motor output shaft and is intended to rotate and indicate a member (not shown). The principle of the invention is in fact not limited solely to modules having hollow spindles. The output wheel 9 has, as for the first module, friction arms 13 cut in the material of the output wheel 9.

The number and size of these friction arms 13 may vary according to the teachings described above in this text.

The invention claimed is:

1. A display module having a two-phase motor comprising:
  a rotor having N pairs of poles magnetised radially, in alternate directions, N being equal to 3 or 5;
  a stator having at least two W-shaped circuits made from radial polar teeth extending inwards from a closed peripheral belt and having a coil on a central leg of the W, the W-shaped circuits being disposed so that, when the central leg of one of the W-shaped circuits is situated facing a rotor magnetic transition, the central leg of another of the W-shaped circuits is situated facing a rotor magnetic pole; and
  at least one mechanical interaction between the rotor and the stator providing angular friction at a force that is substantially constant according to the relative speed of the rotor with respect to the stator, and with a value less than the torque produced by the electromagnetic interaction between the rotor and the stator.

2. A display module according to claim 1, comprising a housing secured to the stator, an assembly for the mechanical reduction of the speed of the motor, comprising an output wheel driving a pointer, and in that the mechanical interaction comprises at least one curved friction arm at a distal part of the output wheel and a sliding track secured to the housing.

3. A display module according to claim 2, wherein the friction arm is a polyoxymethylene polymer material.

4. A display module according to claim 2, wherein the sliding track comes into contact with an end of the friction arm.

5. A display module according to claim 4, wherein the end has a curved shape.

6. A display module according to claim 2, wherein there are N of the friction arms which are flexible, sliding ends of which are spaced apart by 360/N degrees, N being equal to 2 or 3.

7. A display module according to claim 1, wherein the stator comprises an annular belt, the teeth extending radially from an annular segment forming a shoulder fixed on the housing, having a mechanical connector of complementary shape.

8. A display module according to claim 1, wherein at least five of the teeth have identical lengths, measured radially.

9. A display module according to claim 1, wherein a length of the central legs, around which include the coils, is identical.

10. A display module according to claim 9, wherein a length of the coil and of the central leas carrying the coils are substantially equal but less than a cross section of a hollowed-out central area of the stator.

11. A display module according to claim 1, wherein ends of the teeth are parallelepipedal in shape.

12. A display module according to claim 1, further comprising:
  a stop projecting from a flat face of a gear coupled for rotation with the rotor, the stop mechanically contacting with a corresponding stationary stop surface to prevent the gear from travelling more than 360°; and
  the mechanical friction is dry friction between non-lubricated surfaces.

13. A display module according to claim 1, further comprising:
  a stationary cover including a track surface;
  a rotatable gear coupled to the rotor;
  the mechanical interaction being caused by multiple curved arms, formed as part of the rotatable gear, which are deformed by contact against the track surface of the stationary cover; and
  an elongated and curved centerline extending through all of the arms being concentric with a rotational axis of the gear.

14. The display module according to claim 1, wherein the motor is non-lubricated.

15. The display module according to claim 1, further comprising:
  an instrument panel indicator pointer; and
  at least one rotatable polymeric arm including a curved shape containing against a stationary surface without a lubricant therebetween to reduce vibration of the pointer.

16. A display module comprising a two-phase motor comprising:
  a rotor including pairs of poles radially magnetised in alternate directions;
  a stator including W-shaped circuits which each comprise inwardly extending radial polar teeth and a coil on a central tooth of the W;
  a gear coupled for rotation with the rotor;
  a stop projecting from a face of the gear, the stop being adapted to mechanically contact with a stationary stop surface to prevent the gear from traveling more than 360°;
  an instrument panel indicator pointer rotated by the gear; and
  at least one rotatable and deformable arm contacting against a stationary track surface to create a dry friction interaction therebetween, without a lubricant.

17. A display module according to claim 16, wherein the at least one arm includes multiple arms integrally formed with the gear as a single polymeric piece.

18. A display module according to claim 16, wherein the at least one arm includes multiple curved arms, and an elongated and curved centerline extending through all of the arms is concentric with a rotational axis of the gear.

19. A display module according to claim 16, further comprising:
  an output shaft centrally affixed to the gear being hollow, and the shaft being coupled to and rotating the pointer;
  an intermediate transmission rotatably coupling the gear to the rotor;
  at least some teeth of the stator including parallelepiped end shapes; and
  the central tooth of each of the W, which is longer than teeth adjacent thereto, includes a magnetic flux-producing coil wrapped therearound.

20. A display module comprising a two-phase motor comprising:
  a rotor including pairs of poles radially magnetised in alternate directions;
  a stator including W-shaped circuits which each comprise inwardly extending radial polar teeth and a coil on a central tooth of the W;
  a gear coupled for rotation with the rotor;
  an instrument panel indicator pointer rotated by the gear;
  multiple rotatable and deformable arms contacting against a stationary surface to create a dry friction interaction therebetween, without a lubricant, to reduce jolting motion and vibration of the pointer; and
  an elongated and curved centerline extending through all of the arms being concentric with a rotational axis of the gear.

21. A display module according to claim 20, wherein the arms are integrally formed with the gear as a single polymeric piece, and a curved protrusion extends from a face of each of the arms adjacent a distal end thereof.

22. A display module according to claim 20, further comprising:
- an output shaft centrally affixed to the gear being hollow, and the shaft being coupled to and rotating the pointer;
- an intermediate transmission rotatably coupling the gear to the rotor;
- at least some of the teeth of the stator including parallelepiped end shapes; and
- the central teeth, which are longer than teeth adjacent thereto, include magnetic flux-producing coils wrapped therearound.

* * * * *